(12) United States Patent
Kitabayashi

(10) Patent No.: US 10,691,293 B2
(45) Date of Patent: Jun. 23, 2020

(54) DISPLAY DEVICE AND COMPUTER-READABLE NON-TRANSITORY RECORDING MEDIUM WITH DISPLAY CONTROL PROGRAM STORED THEREON

(71) Applicant: KYOCERA Document Solutions Inc., Osaka (JP)

(72) Inventor: Manabu Kitabayashi, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/987,170

(22) Filed: May 23, 2018

(65) Prior Publication Data

US 2018/0348994 A1 Dec. 6, 2018

(30) Foreign Application Priority Data

Jun. 5, 2017 (JP) ................. 2017-110876

(51) Int. Cl.
| | | |
|---|---|---|
| *G06F 3/0481* | (2013.01) | |
| *G06F 3/041* | (2006.01) | |
| *G06F 9/451* | (2018.01) | |
| *H04N 1/00* | (2006.01) | |

(Continued)

(52) U.S. Cl.
CPC ........ *G06F 3/04817* (2013.01); *G06F 3/0416* (2013.01); *G06F 3/0482* (2013.01); *G06F 3/0488* (2013.01); *G06F 3/04883* (2013.01); *G06F 9/453* (2018.02); *H04N 1/00392* (2013.01); *H04N 1/00474* (2013.01)

(58) Field of Classification Search
CPC .............. G06F 3/04817; G06F 3/0416; G06F 3/04883; G06F 3/0482; G06F 3/0488; H04N 1/00474; H04N 1/00392
See application file for complete search history.

(56) References Cited

U.S. PATENT DOCUMENTS

| | | | | |
|---|---|---|---|---|
| 7,783,983 B1 * | 8/2010 | Mayers | ................ | G06F 3/0481 |
| | | | | 715/764 |
| 2005/0071761 A1 * | 3/2005 | Kontio | ................. | G06F 3/0481 |
| | | | | 715/711 |

(Continued)

FOREIGN PATENT DOCUMENTS

JP 2012-133523 A 7/2012

*Primary Examiner* — Tuyetlien T Tran
(74) *Attorney, Agent, or Firm* — IP Business Solutions, LLC

(57) ABSTRACT

An image forming device includes; a control unit acting as a display control section, an operation receiving section and a controller; and a display section having a touch panel function of sensing proximity and contact of an object to and with a display screen. The display control section displays an operation image in which icons are arranged on the display screen. When the operation receiving section receives a user operation of instructing execution of a function of one of the icons, the controller executes the function. After the operation receiving section receives a user operation of putting an object close to one of the icons, when the state where the object is close to the icon continues for a predetermined time, the display control section displays an explanatory image including the icon and an explanatory note describing the function of the icon in the whole area of the display screen.

9 Claims, 9 Drawing Sheets

(51) Int. Cl.
    *G06F 3/0488*     (2013.01)
    *G06F 3/0482*     (2013.01)

(56) References Cited

U.S. PATENT DOCUMENTS

2012/0176398 A1* 7/2012 Takaoka .............. G06F 3/04883
    345/589
2014/0380249 A1* 12/2014 Fleizach ................ G06F 3/017
    715/863
2015/0067594 A1* 3/2015 Choi .................... G06F 3/0481
    715/808

* cited by examiner

DISPLAY DEVICE AND COMPUTER-READABLE NON-TRANSITORY RECORDING MEDIUM WITH DISPLAY CONTROL PROGRAM STORED THEREON

INCORPORATION BY REFERENCE

This application claims priority to Japanese Patent Application No. 2017-110876 filed on Jun. 5, 2017, the entire contents of which are incorporated by reference herein.

BACKGROUND

The present disclosure relates to a display device and a computer-readable non-transitory recording medium with a display control program stored thereon and, particularly, to a technology for displaying icons on a display screen of a display section.

For example, there is a technology for, when proximity of an object (e.g., a user's finger) to a display screen on which an operation image having icons arranged therein is displayed is detected, displaying an explanatory note describing a function of one of the icons displayed near a position in proximity to the object by superposing the explanatory note on the operation image. Accordingly, the user can recognize the function of the icon.

SUMMARY

As an aspect of the present disclosure, a technology realized by further improving the aforementioned technology is proposed.

A display device according to an aspect of the present disclosure includes a display section and a control unit. The display section has a touch panel function of sensing proximity and contact of an object to and with a display screen. The control unit includes a processor and, by executing a control program through the processor, acts as a display control section, an operation receiving section, and a controller. The display control section displays on the display screen an operation image in which a plurality of icons are arranged. The operation receiving section receives an operation from a user through the touch panel function. When the operation receiving section receives a user operation of instructing execution of a function correlated to one icon of the plurality of icons, the controller executes the function. After the operation receiving section receives a user operation of putting an object close to one icon of the plurality of icons displayed on the display screen, when a state in which the object is being close to the one icon continues for a predetermined time, the display control section displays an explanatory image including the one icon and a description of the function correlated to the one icon in a whole area of the display.

In addition, in a computer-readable non-transitory recording medium with a display control program stored thereon according to another aspect of the present disclosure, the display control program causes a computer including a processor to act, when the processor executes the display control program, as a display control section, an operation receiving section and a controller. The display control section displays an operation image in which a plurality of icons are arranged on a display screen of a display section having a touch panel function of sensing proximity and contact of an object. The operation receiving section receives an operation from a user through the touch panel function. When the operation receiving section receives a user operation of instructing execution of a function correlated to one icon of the plurality of icons, the controller executes the function. The display control program further causes the computer to act so that, after the operation receiving section receives a user operation of putting an object close to one icon of the plurality of icons displayed on the display screen, when a state in which the object is being close to the one icon continues for a predetermined time, the display control section displays an explanatory image including the one icon and a description of the function correlated to the one icon in a whole area of the display.

DETAILED DESCRIPTION

Figure 1:
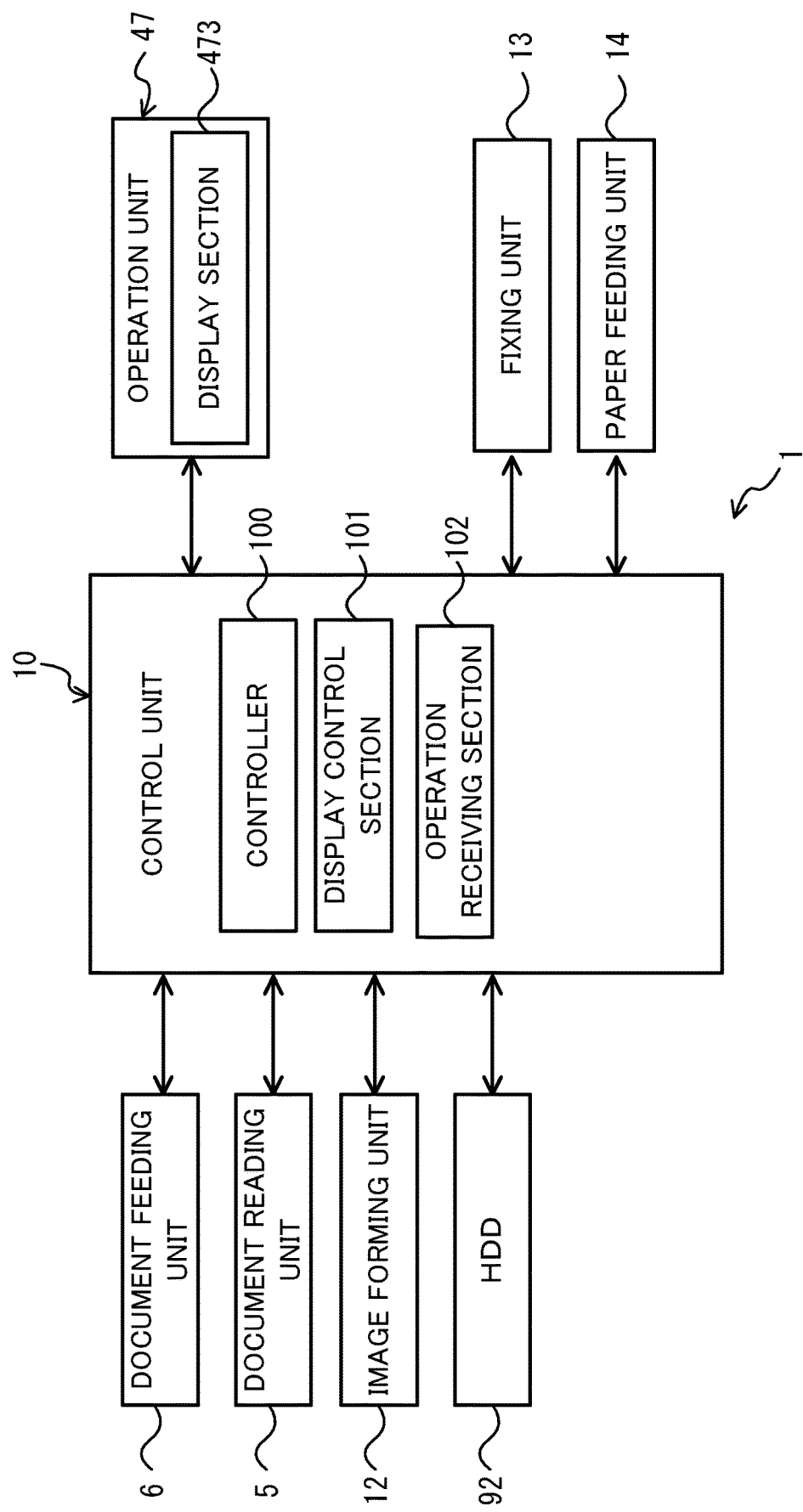
FIG. 1 is a functional block diagram schematically illustrating major internal components of an image forming device as a display device according to a first embodiment of the present disclosure.

Hereinafter, a display device and a computer-readable non-transitory recording medium with a display control program stored thereon according to an embodiment of the present disclosure will be described with reference to the drawings. FIG. 1 is a functional block diagram schematically illustrating major internal components of an image forming device as a display device according to the first embodiment of the present disclosure.

The display device according to the first embodiment is, for example, an image forming device 1. The image forming device 1 has a plurality of functions such as a copy function, a printer function, a scanner function and a facsimile function. The image forming device 1 includes a control unit 10, a document feeding unit 6, a document reading unit 5, an image forming unit 12, a fixing unit 13, a paper feeding unit 14, an HDD 92 and an operation unit 47.

A case in which a document reading operation is performed in the image forming device 1 will be described. An image of a document transferred through the document feeding unit 6 or a document mounted on a platen glass is optically read by the document reading unit 5 and thus image data is generated. The image data generated by the document reading unit 5 is stored in an image memory that is not shown, and the like.

A case in which an image forming operation is performed in the image forming device 1 will be described. The image forming unit 12 forms an image on recording paper serving as a recording medium and being fed from the paper feeding unit 14 on the basis of image data generated through the document reading operation, image data received from a computer as an external device connected through a network, or the like.

The fixing unit 13 fixes a toner image onto the recording paper through thermal compression, and the recording paper on which the fixing process has been performed is ejected to an ejection tray. The paper feeding unit 14 includes a paper feeding cassette.

The operation unit 47 receives instructions such as an image forming operation execution instruction from an operator with respect to various operations and processes that can be executed by the image forming device 1. The operation unit 47 includes a display section 473 that displays an operation guidance and the like to the operator. The display section 473 has a touch panel function that senses proximity and contact of an object (e.g., a user's finger) to and with a display screen and, when the user's finger approaches or comes in contact with the display screen, transmits a signal indicating the proximity position or the contact position to the control unit 10. A display control section 101 (which will be described later) changes display screens of the display section 473 on the basis of the signal. Accordingly, the operator can operate the image forming device 1 by putting a finger close to an icon, a button or a key displayed on the screen or touching the same with the finger.

The control unit 10 includes a processor, a random access memory (RAM), a read only memory (ROM) and a dedicated hardware circuit. For example, the processor is a central processing unit (CPU), an application specific integrated circuit (ASIC), a micro-processing unit (MPU) or the like. The control unit 10 includes a controller 100, a display control section 101 and an operation receiving section 102.

The control unit 10 serves as the controller 100, the display control section 101 and the operation receiving section 102 through operations according to a display control program and the like according to an embodiment of the present disclosure, which is stored in the HDD 92. Here, the controller 100 and the like may be respectively configured using hardware circuits instead of operations according to the display control program and the like, performed by the control unit 10. This similarly applies to each embodiment hereinafter unless particularly mentioned.

The controller 100 controls the overall operation of the image forming device 1. The controller 100 is connected to the document feeding unit 6, the document reading unit 5, the image forming unit 12, the fixing unit 13, the paper feeding unit 14 and the operation unit 47 and controls driving of these components.

Figure 2A:
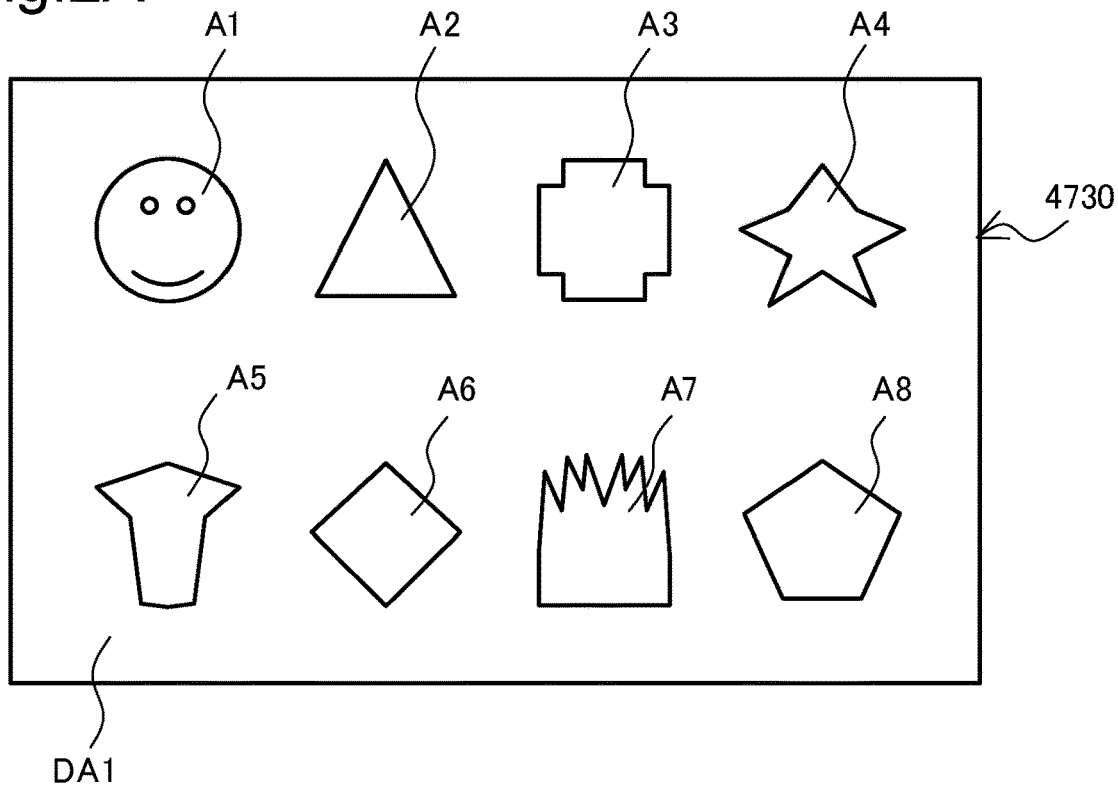
FIG. 2A and FIG. 2B are diagrams illustrating an example of an operation image displayed on a display screen of a display section.
Figure 2B:
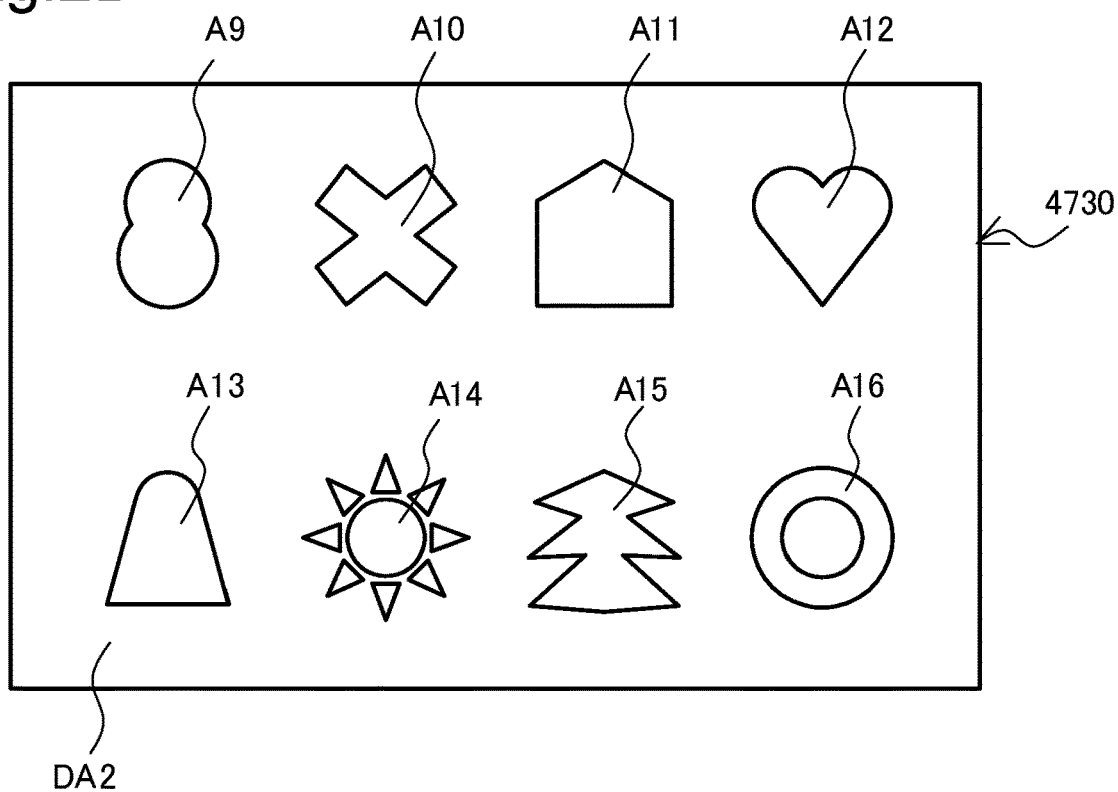

The display control section 101 controls display of the display section 473. For example, the display control section 101 reads an image showing icons (simply referred to as icons hereinafter) stored in the HDD 92 and displays a read operation image (for example, an operation image DA1 shown in FIG. 2A and an operation image DA2 shown in FIG. 2B) in which a plurality of icons are arranged on a display screen 4730 of the display section 473. FIG. 2A and FIG. 2B are diagrams illustrating examples of the operation image displayed on the display screen 4730 of the display section 473. A plurality of icons A1 to A8 are arranged in the operation image DA1 shown in FIG. 2A and a plurality of different icons A9 to A16 are arranged in the operation image DA2 shown in FIG. 2B.

The operation receiving section 102 receives a user operation input by a user to the operation unit 47. The display section 473 serving as the operation unit 47 includes the touch panel function, as described above, and proximity or contact of the user to or with the display screen 4730 of the display section 473 are input as a user operation through the touch panel function. The operation receiving section 102 receives the user operation.

For example, the operation receiving section 102 receives, as a user operation, a gesture operation, such as putting a finger close to the display screen 4730, sliding of a finger in the air in a state in which the finger is close to the display screen 4730, an action of tapping the display screen 4730 with a finger once (tapping operation) or an action of quickly flicking the display screen 4730 with a finger (flicking operation).

Figure 3:
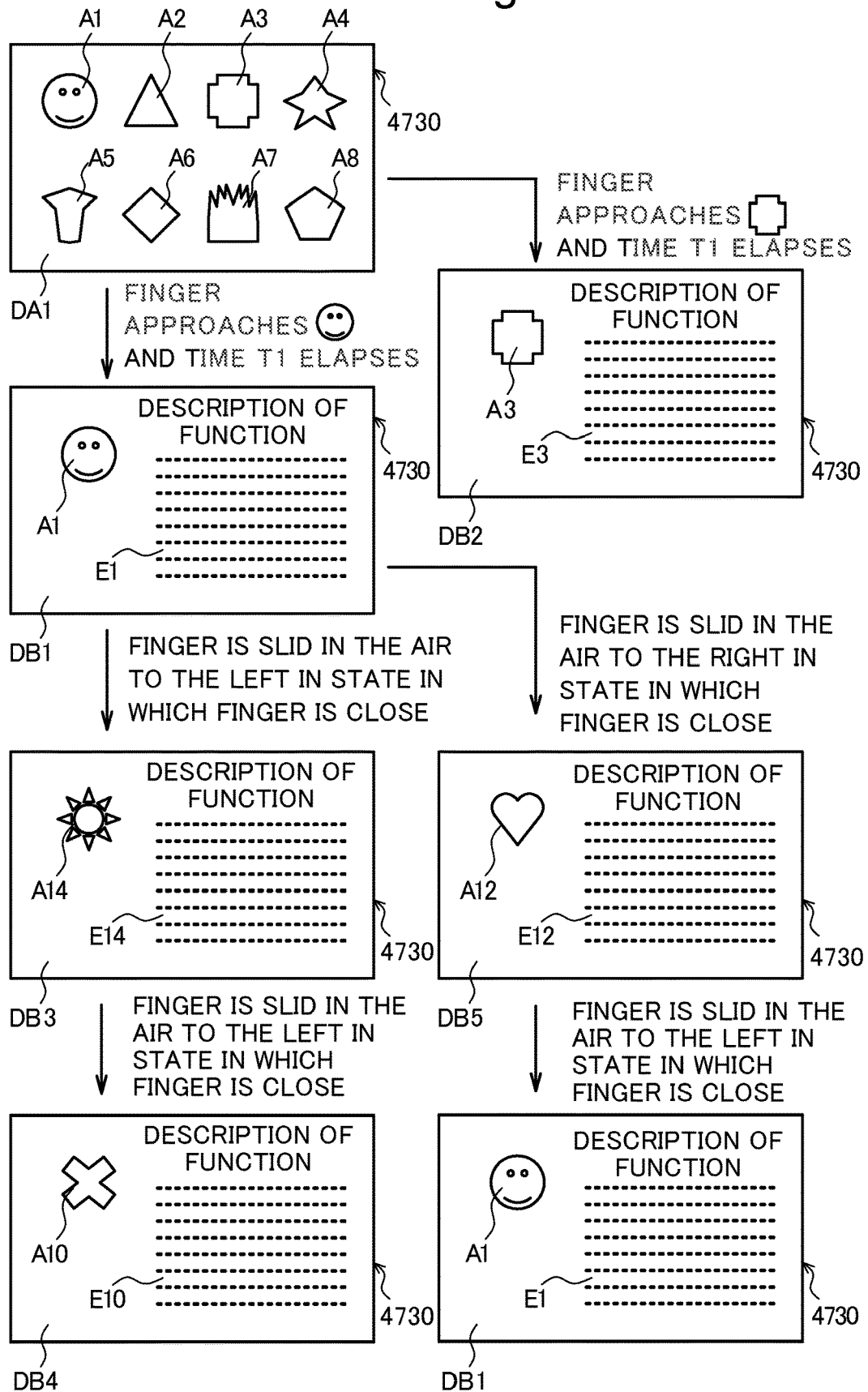
FIG. 3 is a diagram illustrating an example of change of images displayed on the display screen of the display section.

When a state in which an object is close to an icon displayed on the display screen 4730 continues for a predetermined time T1 (e.g., 2 seconds) after the operation receiving section 102 receives a user operation of putting the object close to the icon, the display control section 101 reads text data of an explanatory note that describes the function of the icon, which is stored in the HDD 92, and displays an explanatory image showing the icon and the explanatory note describing the function of the icon (an image describing the function of the icon, for example, explanatory images DB1 and DB2 shown in FIG. 3) in the whole area of the display screen 4730.

FIG. 3 is a diagram illustrating an example of change of images displayed on the display screen 4730 of the display section 473. The plurality of icons A1 to A8 are arranged in the operation image DA1 displayed on the upper left of FIG. 3. When the user puts a finger close to the icon A1 displayed in the operation image DA1 and the state in which the finger is close to the icon A1 continues for the predetermined time T1, the explanatory image DB1 including the icon A1 and an explanatory note E1 describing the function of the icon A1 is displayed in the whole area of the display screen 4730 by the display control section 101.

In addition, when the user puts a finger close to the icon A3 displayed in the operation image DA1 and the state in which the finger is close to the icon A3 continues for the predetermined time T1, the explanatory image DB2 including the icon A3 and an explanatory note E3 describing the function of the icon A3 is displayed in the whole area of the display screen 4730 by the display control section 101.

The operation receiving section 102 receives a user operation of instructing a display change to an explanatory image including an icon different from an icon, which is included in an explanatory image (e.g., explanatory image DB1) displayed on the display screen 4730, and an explanatory note describing the function of the different icon. As the user operation, an operation of sliding an object in the air in a state in which the object (e.g., a user's finger) is close to the explanatory image displayed on the display screen of the display section 473 may be conceived.

When the operation receiving section 102 receives this user operation, the display control section 101 performs display change to sequentially change explanatory image displays. Specifically, an order is assigned to each icon in advance, and the display control section 101 reads an icon preceding or following, in order, an icon included in an explanatory image displayed on the display screen 4730 at this time and text data of an explanatory note describing the function of the icon from the HDD 92 in response to the direction of sliding received by the operation receiving section 102 and displays an explanatory image including the icon and the explanatory note describing the function of the icon in the whole area of the display screen 4730. In this manner, the display control section 101 sequentially changes and displays explanatory images for all icons stored in the image forming device 1 in a cyclical manner.

Figure 4:
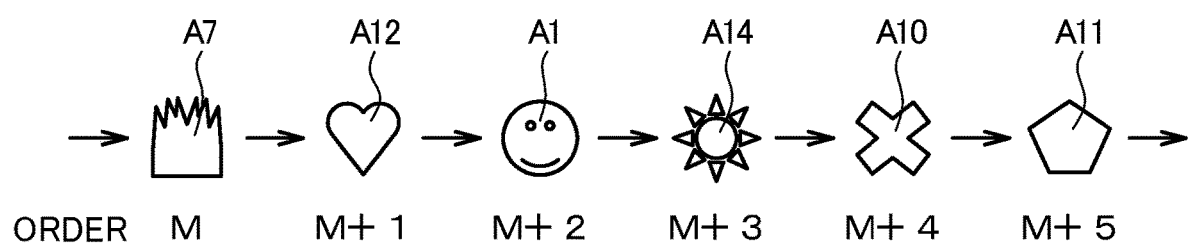
FIG. 4 is an explanatory diagram for describing an order assigned to each icon.

Hereinafter, a description will be given on the assumption that the order is assigned to each icon in such a manner that the M-th icon A7 is followed by the (M+1)-th icon A12 which is followed by the (M+2)-th icon A1 which is followed by the (M+3)-th icon A14 which is followed by the (M+4)-th icon A10 which is followed by the (M+5)-th icon A11, as shown in FIG. 4.

For example, when the user slides a finger to the left in the air in a state in which the finger is close to the explanatory image DB1 (FIG. 3), an explanatory image DB3 including the icon A14 following the icon A1 in order and an explanatory note E14 describing the function of the icon A14 is displayed in the whole area of the display screen 4730 by the display control section 101. In addition, when the user slides a finger to the left in the air in a state in which the finger is close to the explanatory image DB3, an explanatory image DB4 including the icon A10 following the icon A14 in order and an explanatory note E11) describing the function of the icon A10 is displayed in the whole area of the display screen 4730 by the display control section 101.

On the other hand, when the user slides a finger to the right (i.e., in a direction reverse to a forward direction when the left direction is regarded as the forward direction) in the air in a state in which the finger is close to the explanatory image DB1, an explanatory image DB5 including the icon A12 preceding the icon A1 in order and an explanatory note E12 describing the function of the icon A12 is displayed in the whole area of the display screen 4730 by the display control section 101. In addition, when the user slides a finger to the left (i.e., in the forward direction) in the air in a state in which the finger is close to the explanatory image DB5, the explanatory image DB1 including the icon A1 following the icon A12 in order and an explanatory note E1 describing the function of the icon A1 is displayed again in the whole area of the display screen 4730 by the display control section 101.

When the operation receiving section 102 receives a first operation (e.g., long press) predetermined for an icon (e.g., icon A14) included in an explanatory image in a state in which an explanatory image (e.g., explanatory image DB3) is displayed on the display screen 4730, the controller 100 reads a program correlated to the icon and stored in the HDD 92 and executes the function of the icon.

On the other hand, when the operation receiving section 102 receives a second operation (e.g., tapping operation) predetermined for an icon (e.g., icon A14) included in an explanatory image in a state in which the explanatory image (e.g., explanatory image DB3) is displayed on the display screen 4730, the display control section 101 changes the display of the display screen 4730 to the operation image (e.g., the operation image DA2 shown in FIG. 2) in which the icon is disposed and displays an image showing the change process through an animation. In addition, after the change performed by the display control section 101, the controller 100 reads a program correlated to the icon and stored in the HDD 92 and executes the function of the icon.

Figure 5:
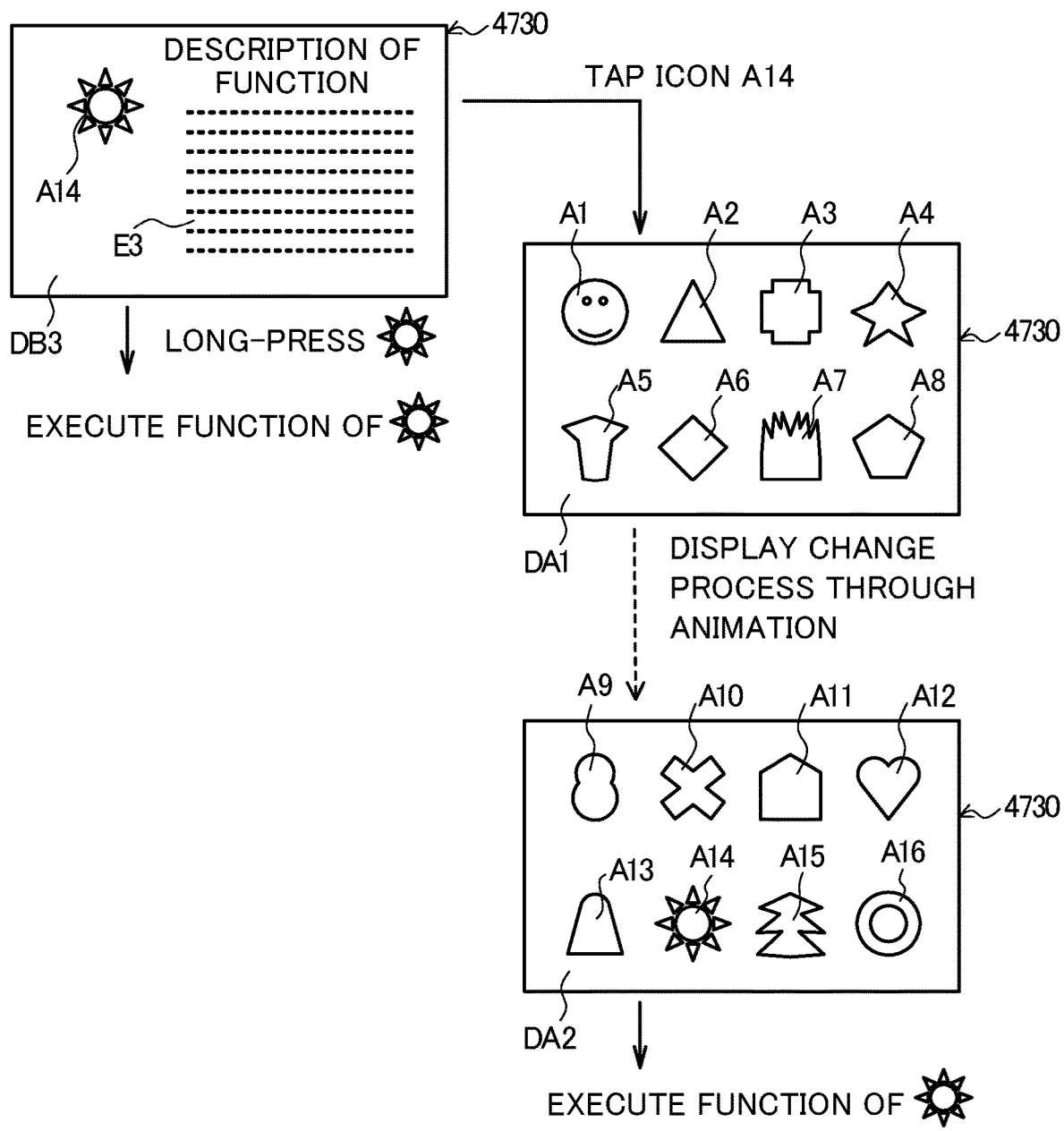
FIG. 5 is a diagram illustrating an example of change of images displayed on the display screen of the display section.

FIG. 5 is a diagram illustrating an example of change of images displayed on the display screen 4730 of the display section 473. When the icon A14 displayed in the explanatory image DB3 shown at the upper left of FIG. 5 is long-pressed and the operation receiving section 102 receives this long press operation, the controller 100 immediately executes the function of the icon A14.

On the other hand, when a tapping operation is performed on the icon A14 displayed in the explanatory image DB3 and the operation receiving section 102 receives this tapping operation, the operation image DA2 in which the icon A14 is disposed is displayed in the display screen 4730 by the display control section 101, and then the function of the icon A14 is executed by the controller 100. Meanwhile, the display control section 101 does not instantaneously perform an image change to the operation image DA2 and displays the operation image DA1 on the display screen 4730 first and then displays an image showing the change process through an animation.

Figure 6:
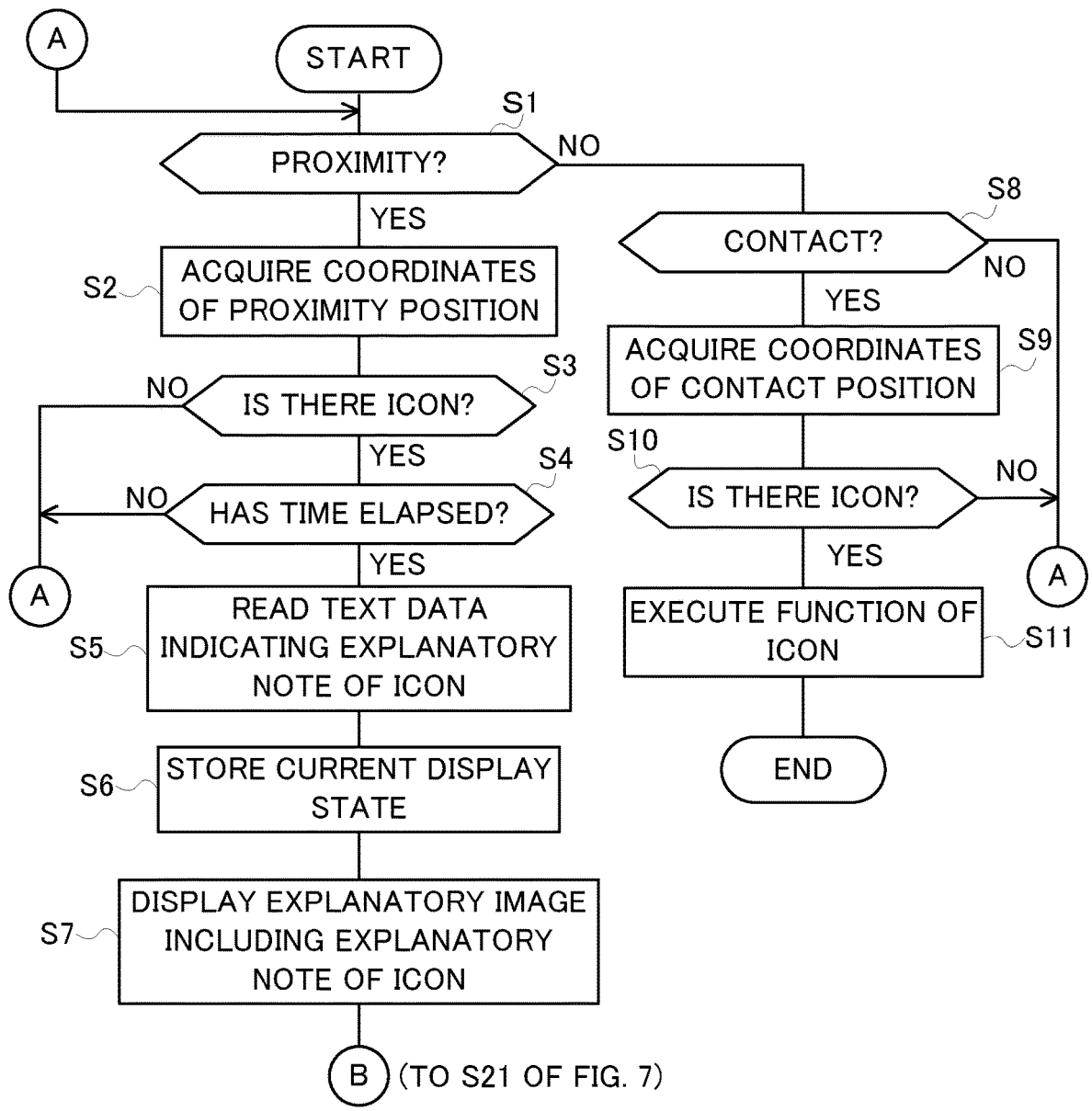
FIG. 6 is a flowchart illustrating an example of a process performed by a control unit in the image forming device as the display device according to the first embodiment.

Next, an example of a process performed by the control unit 10 of the image forming device 1 as the display device according to the first embodiment will be described on the basis of flowcharts shown in FIG. 6 and FIG. 7. Meanwhile, this process is performed when an operation image (e.g., the operation image DA1 shown in FIG. 3) is displayed on the display screen 4730 of the display section 473.

When the operation receiving section 102 receives a user operation of putting an object close to the display screen 4730 (YES in S1), the display control section 101 acquires coordinates indicating the position close to the object from operation information provided from the operation unit 47 (S2) and determines whether an icon is disposed at the position close to the object on the basis of the acquired coordinates (S3).

When the display control section 101 determines that an icon is disposed at the position close to the object (YES in S3), the display control section 101 determines whether the state in which the object is close to the position has continued for the predetermined time T1 from the time at which the operation receiving section 102 registered the proximity of the object to the display screen 4730 (S4). On the contrary, when the display control section 101 determines that no icon is disposed at the position close to the object (NO in S3), the process returns to S1.

When the display control section 101 determines that the state in which the object is close to the position has continued for the predetermined time T1 (YES in S4), the display control section 101 reads text data of an explanatory note describing the function of the corresponding icon, stored in the HDD 92 (S5), stores the content displayed on the display screen 4730 at this time in the HDD 92 (S6), and then displays an explanatory image (e.g., the explanatory image DB1 shown in FIG. 3) including the icon and the explanatory note describing the function of the icon in the whole area of the display screen 4730 (S7). Thereafter, the process proceeds to S21 (FIG. 7).

On the other hand, when the display control section 101 determines that the state in which the object is close to the position has not continued for the predetermined time T1 (NO in S4), the process returns to S1. That is, when the operation receiving section 102 has not registered proximity of the object to the display screen 4730 until the predetermined time T1 elapses (i.e., when the object is separated from the display screen 4730 or the object comes in contact with the display screen 4730), the process returns to S1 instead of proceeding to S5.

In addition, when the display control section 101 determines that the operation receiving section 102 has not registered proximity of the object to the display screen 4730

(NO in S1) in S1, the display control section 101 determines whether the operation receiving section 102 has received a user operation of touching the display screen 4730 with the object (S8).

When the display control section 101 determines that the operation receiving section 102 has received the user operation of touching the display screen 4730 with the object (YES in S8), the display control section 101 acquires coordinates indicating the position touched by the object on the basis of operation information transmitted from the operation unit 47 (S9) and determines whether an icon is disposed at the position touched by the object on the basis of the acquired coordinates (S10).

When the display control section 101 determines that an icon is disposed at the position touched by the object (YES in S10), the controller 100 reads a program correlated to the icon stored in the HDD 92 and executes the function of the icon (S11). Thereafter, the process ends. On the other hand, when the display control section 101 determines that no icon is disposed at the position touched by the object (NO in S10), the process returns to S1.

Figure 7:
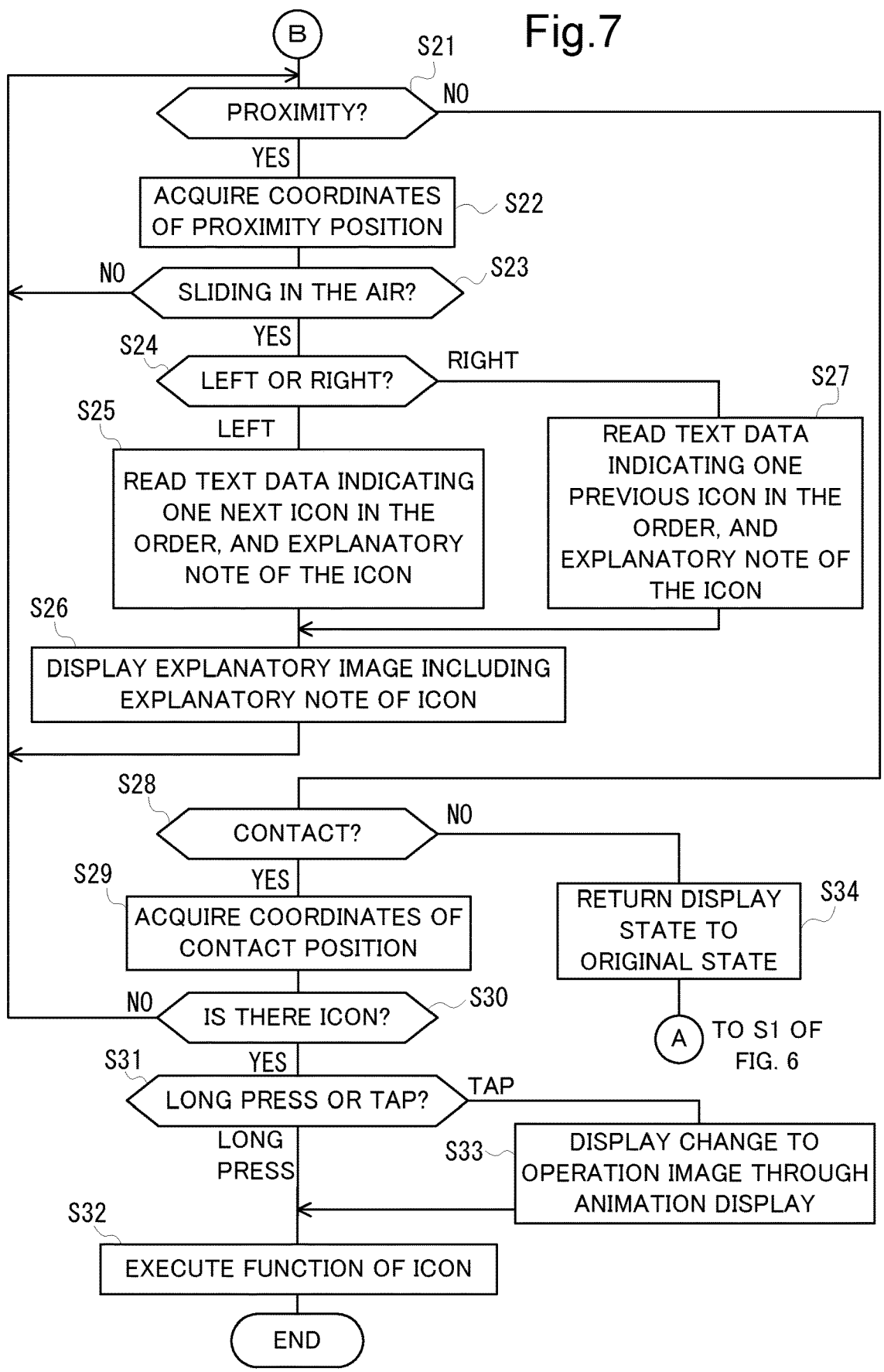
FIG. 7 is a flowchart illustrating an example of a process performed by the control unit in the image forming device as the display device according to the first embodiment.

In S21 shown in FIG. 7, the display control section 101 determines whether the operation receiving section 102 has registered proximity of the object to the display screen 4730 (S21) and, when it is determined that the operation receiving section 102 has registered proximity of the object to the display screen 4730 (YES in S21), acquires coordinates indicating the position close to the object from operation information provided from the operation unit 47 (S22). The display control section 101 determines whether the object has been slid in any of leftward and rightward directions in the air on the basis of the acquired coordinates (also including the last acquired coordinates) (S23). For example, when the coordinates (the coordinates indicating the position close to the object) have changed by a predetermined magnitude or more in any of the leftward and rightward directions, the display control section 101 may determine that the object has been slid in the air.

When the display control section 101 determines that the object has been slid in the air (YES in S23), the display control section 101 further determines whether the direction in which the object has been slid is any of the leftward and rightward directions (S24). When it is determined that the direction in which the object has been slid is the leftward direction (to the left in S24), the display control section 101 reads text data of an explanatory note describing the function of an icon following, in order, an icon included in an explanatory image displayed on the display screen 4730 at this time from the HDD 92 (S25) and displays an explanatory image (e.g., the explanatory image DB3 shown in FIG. 3) including the icon and the explanatory note describing the function of the icon in the whole area of the display screen 4730 (S26). Thereafter, the process returns to S21.

On the other hand, when the display control section 101 determines that the object has been slid in the rightward direction (i.e., reverse to the forward direction when the leftward direction is regarded as the forward direction) (to the right in S24), the display control section 101 reads text data of an explanatory note describing the function of an icon preceding, in order, the icon included in the explanatory image displayed on the display screen 4730 from the HDD 92 (S27) and displays an explanatory image (e.g., the explanatory image DB5 shown in FIG. 3) including the icon and the explanatory note describing the function of the icon in the whole area of the display screen 4730 (S26). Thereafter, the process returns to S21.

In addition, when the display control section 101 determines that the object has not been slid in the air in S23 (NO in S23), the process returns to S21.

When the display control section 101 determines that the operation receiving section 102 has not registered proximity of the object to the display screen 4730 in S21 (NO in S21), the display control section 101 determines whether the operation receiving section 102 has received a user operation of touching the display screen 4730 with the object (S28).

When the display control section 101 determines that the operation receiving section 102 has received the user operation of touching the display screen 4730 with the object (YES in S28), the display control section 101 acquires coordinates indicating the position touched by the object (S29) on the basis of operation information transmitted from the operation unit 47 and determines whether an icon is disposed at the position touched by the object on the basis of the acquired coordinates (S30).

When the display control section 101 determines that an icon is disposed at the position touched by the object (YES in S30), the controller 100 determines whether the user operation received by the operation receiving section 102 is any one of a predetermined first operation (e.g., a long press) and a predetermined second operation (e.g., tapping operation) (S31).

When the controller 100 determines that the user operation received by the operation receiving section 102 is the predetermined first operation (the long press in S31), the controller 100 reads a program correlated to the icon stored in the HDD 92 and executes the function of the icon (S32). Thereafter, the process ends.

On the other hand, when the controller 100 determines that the user operation received by the operation receiving section 102 is the predetermined second operation (tapping in S31), the display control section 101 changes the display of the display screen 4730 to the operation image (e.g., the operation image DA2 shown in FIG. 5) in which the corresponding icon is disposed and further displays an image showing the change process through an animation, as shown at the right of FIG. 5 (S33). After the display control section 101 completes the change, the controller 100 reads a program correlated to the corresponding icon and stored in the HDD 92 and executes the function of the icon (S32). Thereafter, the process ends.

In addition, when the display control section 101 determines that the operation receiving section 102 has not received the user operation of touching the display screen 4730 with the object in S28 (NO in S28), the object is removed from the display screen 4730, and thus the display control section 101 returns the display of the display screen 4730 to the state before display change, which is stored in S7 (FIG. 6) (S34). Thereafter, the process returns to S1 (FIG. 6).

According to the first embodiment, an explanatory image including an explanatory note describing the function of an icon is displayed in the whole area of the display screen 4730, and thus the area in which the explanatory note is displayed is relatively wide. Accordingly, it is possible to realize detailed description of the function of an icon without a complicated display on the display screen 4730. In addition, although the user accustomed to use the display device may feel troublesome when a display change to an explanatory image is performed whenever an object (e.g., a user's finger) is put close to an icon, the above-described display change is performed not only when the object is put close to the icon but also when the state in which the object is close to the icon continues for the predetermined time T1, and thus the user can avoid feeling troublesome due to the display change.

Meanwhile, although the technology disclosed in the background displays an explanatory note for describing the function of an icon, the explanatory note is displayed by overlapping with a part of an operation image and thus an area in which the explanatory note is displayed is relatively narrow. Accordingly, it is difficult to describe the function of the icon in detail. Particularly, the function of an icon associated with a plurality of options requires a large amount of description, and thus it is difficult to describe the function in a narrow area. Even if the function can be described, a display on the display screen of the display section may become complicated.

On the other hand, the present embodiment can realize a display of appropriate description of the function of an icon while preventing the display on the display screen of the display section from becoming complicated.

Furthermore, in the technology disclosed in the background, to recognize the function of an icon that is not displayed on the display screen 4730 at this time, it is necessary to display an operation image in which the icon is disposed on the display screen 4730 first and thus it is a cumbersome to display the operation image in which the target icon is disposed on the display screen 4730. Moreover, if the user does not know the place where the target icon is disposed, it is not easy to reach the place. Particularly, when operation images (display screens) are layered as in multifunctional devices, smartphones and the like and icons are arranged in a scattered manner in an operation image of each layer, it may be difficult to reach an operation image in which the target icon is disposed.

On the other hand, in the above-described first embodiment, explanatory images with respect to all icons can be sequentially changed in a cyclical manner and thus the user can recognize the function of a target icon without displaying the operation image in which the target icon is disposed on the display screen 4730. Accordingly, operation efficiency can be improved.

In addition, in the above-described first embodiment, the function of an icon having an explanatory image is executed when the user touches (e.g., long-presses or taps) the icon. That is, it is possible to execute the function of a target icon by operating an explanatory image without displaying an operation image in which the target icon is disposed on the display screen 4730, and thus usability is considerably improved.

Furthermore, when a tapping operation is performed on an icon, the operation image in which the target icon is disposed is displayed first on the display screen 4730 through an animation and then the function of the target icon is executed, and thus the user can correctly recognize the place where the target icon is disposed. Accordingly, the efficiency of the following operations can be improved.

Figure 8:
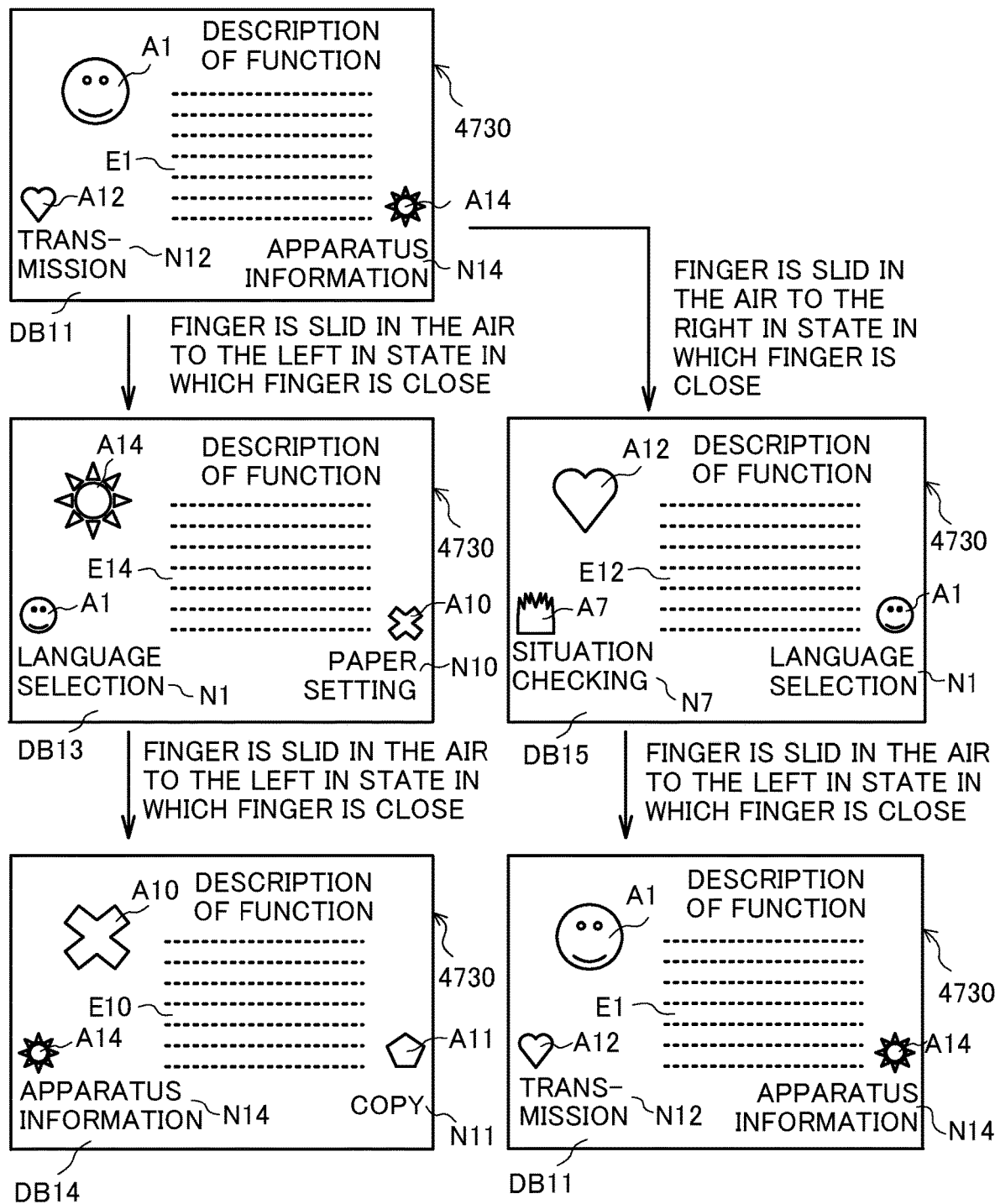
FIG. 8 is a diagram illustrating an example of change of images displayed on the display screen of the display section.

In addition, as another embodiment, as shown in FIG. 8, the display control section 101 may read an icon that is a target to be changed to in each of the forward direction and the reverse direction and the name of the icon from the HDD 92 in the order assigned to each icon and display an explanatory image including the icon that is the target to be changed to and the name of the icon on the display screen 4730 before being changed. For example, the icon A14 following the icon A1 in order, which is a target to be changed to when sliding in the forward direction is performed, and the name N14 thereof are displayed at the right edge of the explanatory image DB 11, and the icon A12 preceding the icon A1 in order and the name N12 thereof are displayed at the left edge of the explanatory image DB11 by the display control section 101.

In the same manner, the icon A10 and the name N10 thereof, the icon A11 and the name N11 thereof, and the icon A1 and the name N1 thereof are respectively displayed at the right edges of explanatory images DB13, DB14 and DB15, and the icon A1 and the name N1 thereof, the icon A14 and the name N14 thereof, and the icon A7 and the name N7 thereof are respectively displayed at the left edges of explanatory images DB13, DB14 and DB15 by the display control section 101.

In addition, as further another embodiment, when a user operation of instructing display of an explanatory image (e.g., the explanatory image DB1 shown in FIG. 3) is received, the display control section 101 may transparently display an operation image (e.g., the operation image DA1 shown in FIG. 3), which has been displayed on the display screen 4730 at the time, such that the user views the explanatory image through the operation image, to thereby simultaneously display the operation image and the explanatory image on the display screen 4730. Meanwhile, it is desirable that the operation image have high transparency (transmittance) such that the display on the display screen 4730 does not become complicated.

Furthermore, although a case in which the operation of sliding an object in the air in a state in which the object is close to an explanatory image is performed as the user operation of instructing a display change to an explanatory image including an icon different from an icon, included in an explanatory image displayed on the display screen 4730, and an explanatory note describing the function of the different icon has been described in the above-described first embodiment, the user operation may be an operation of moving the object while the object is in contact with the explanatory image (e.g., an operation of flicking the object to the left or right) in a second embodiment.

For example, when the operation receiving section 102 receives a flicking operation in the leftward direction through the display screen 4730 on which the explanatory image DB1 (FIG. 3) is displayed, the display control section 101 may display the explanatory image DB3 (FIG. 3). When the operation receiving section 102 receives a flicking operation in the rightward direction through the display screen 4730 on which the explanatory image DB1 is displayed, the display control section 101 may display the explanatory image DB5 (FIG. 3).

Figure 9:
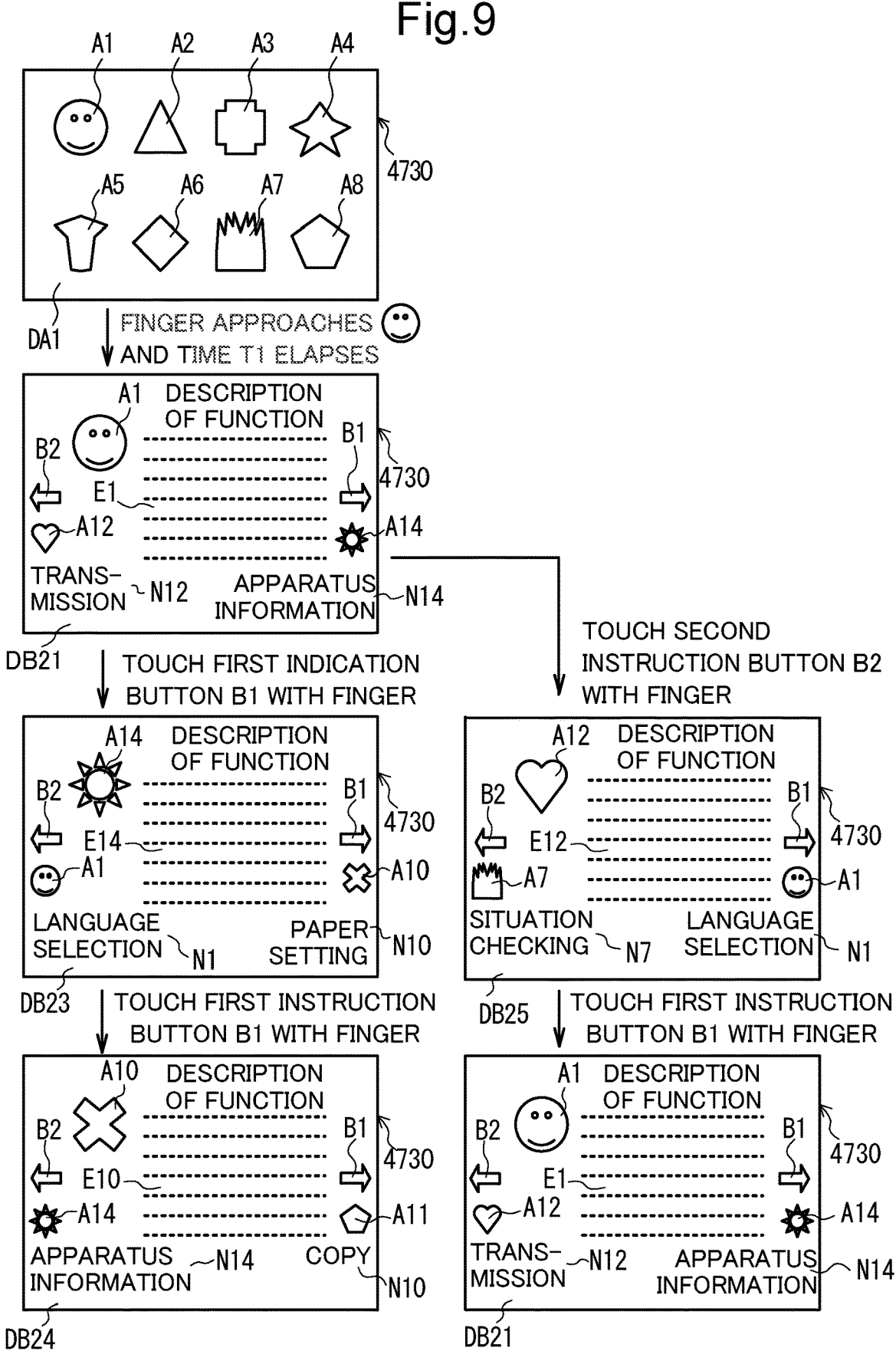
FIG. 9 is a diagram illustrating an example of change of images displayed on the display screen of the display section.

Further another embodiment will be described. The operation receiving section 102 receives an operation performed on a first instruction button B1 (a right arrow shown in FIG. 9) or a second instruction button B2 (a left arrow shown in FIG. 9) displayed by the display control section 101 as the user operation. For example, the display control section 101 displays an explanatory image (e.g., an explanatory image DB21) including the first instruction button B1 that instructs a display change of the explanatory images in the forward direction and the second instruction button B2 that instructs a display change of explanatory images in the direction reverse to the forward direction on the display screen 4730, as shown in FIG. 9. In addition, when the operation receiving section 102 receives an operation of touching the first instruction button B1 with an object (e.g., tapping operation) in a state in which the explanatory image DB21 is displayed on the display screen 4730, the display control section 101 displays an explanatory image DB23. Further, when the operation receiving section 102 receives an operation of touching the first instruction button B1 with an object in a state in which the explanatory image DB23 is displayed, the display control section 101 displays an explanatory image DB24.

On the other hand, when the operation receiving section 102 receives an operation of touching the second instruction button B2 with an object in a state in which the explanatory image DB21 is displayed on the display screen 4730, the display control section 101 displays an explanatory image DB25. When the operation receiving section 102 receives an operation of touching the first instruction button B1 with an object in a state in which the explanatory image DB25 is displayed, the display control section 101 displays the explanatory image DB21.

The present disclosure is not limited to the configuration of the above-described embodiments and may be modified in various manners. For example, although an embodiment of the display device according to the present disclosure is described using an image forming device in the above embodiments, this is merely an example and the display device according to the present disclosure may be a mobile device such as a smartphone including a display section or other electronic apparatuses.

Furthermore, in the above-described embodiments, the configurations and the processes described in the above embodiments using FIGS. 1 to 9 are merely embodiments of the present disclosure and the present disclosure is not limited to the configurations and the processes.

While the present disclosure has been described in detail with reference to the embodiments thereof, it would be apparent to those skilled in the art the various changes and modifications may be made therein within the scope defined by the appended claims.

What is claimed is:

1. A display device comprising:
 a display section including a display screen and having a touch panel function of sensing proximity and contact of an object to and with the display screen;
 a control unit including a processor, and, when the processor executes a control program, configured to act as a display control section, an operation receiving section, and a controller,
 the display control section being configured to cause the display screen to individually display a plurality of operation images in which a plurality of icons are arranged;
 the operation receiving section being configured to receive an operation from a user through the touch panel function; and
 the controller being configured to, when the operation receiving section receives a user operation of instructing execution of a function correlated to one icon of the plurality of icons, execute the function,
 wherein after the operation receiving section receives a user operation of putting an object close to one icon of one operation image being displayed on the display screen, the one operation image being one of the plurality of operation images, when a state in which the object is being close to the one icon continues for a predetermined time, the display control section causes the display screen to display, in a whole area thereof, an explanatory image including the one icon and a description of the function correlated to the one icon,
 wherein when the display screen displaying the explanatory image is displayed, the operation receiving section receives a user operation of instructing a display change to an explanatory image including a different icon different from the icon corresponding to the explanatory image displayed on the display screen and a description of a function correlated to the different icon,
 an order different from an arrangement order of each of the icons of the plurality of operation images is assigned to all the icons of the plurality of operation images in advance, the order being a cyclical manner,
 when the operation receiving section receives, as the user operation of instructing the display change to the explanatory image including the different icon and the description of the function correlated to the different icon, an operation of a sliding movement in a forward direction or in a reverse direction,
 (i) the display control section changes, if the sliding movement is in the reverse direction, the display to an explanatory image including: an icon whose order of the order is one preceding the icon included in the explanatory image displayed on the display screen at this time; and a description of a function correlated to the icon, and
 (ii) the display control section changes, if the sliding movement is in the forward direction, the display to an explanatory image including: an icon whose order of the order is one following the icon included in the explanatory image displayed on the display screen at this time; and a description of a function correlated to the icon, and
 in accordance with the order, the display control section sequentially changes and causes the display screen to display each of the explanatory images for all the icons of the plurality of operation images in the cyclical manner.

2. The display device according to claim 1, wherein the display control section transparently displays the operation image that has been displayed on the display screen when the user operation was received and causes the display screen to simultaneously display the operation image and the explanatory image.

3. The display device according to claim 1, wherein in accordance with the order assigned to all the icons of the plurality of operation images, the display control section causes the display screen to display the explanatory image including an image showing an icon to be changed, the icon to be changed being a target to be changed to for each of the icons whose order of the order is one preceding and one following the icon included in the explanatory image displayed on the display screen at this time.

4. The display device according to claim 1, wherein in accordance with the order assigned to all the icons of the plurality of operation images, the display control section causes the display screen to display the explanatory image including an image showing an icon to be changed and a name of the icon, the icon to be changed being a target to be changed to for each of the icons whose order of the order is one preceding and one following the icon included in the explanatory image displayed on the display screen at this time.

5. The display device according to claim 1, wherein
 the operation receiving section receives, as the user operation of instructing the display change, an operation of sliding an object in the air in a state in which the object is close to the explanatory image, and
 the display control section changes the display to an explanatory image including a different icon correlated to the sliding direction and a description of a function correlated to the different icon when the operation receiving section receives the user operation of sliding the object in the air.

6. The display device according to claim 1, wherein
the operation receiving section receives, as the user operation of instructing the display change, an operation of moving an object in contact with the explanatory image, and
the display control section changes the display to an explanatory image including a different icon correlated to the sliding direction and a description of the function correlated to the different icon when the operation receiving section receives the user operation of moving the object in contact with the explanatory image.

7. The display device according to claim 1, wherein
the display control section causes the display screen to display the explanatory image including a first instruction button instructing a display change of the explanatory images in the forward direction and a second instruction button instructing a display change of the explanatory images in the reverse direction,
the operation receiving section receives, as the user operation of instructing the display change, an operation of bringing an object into contact with the first instruction button or the second instruction button, and
the display control section changes the display of the display section to the explanatory image correlated to the forward direction when the operation receiving section receives a user operation of touching the first instruction button with the object and changes the display of the display section to the explanatory image correlated to the reverse direction when the operation receiving section receives a user operation of touching the second instruction button with the object.

8. The display device according to claim 1, wherein
when the operation receiving section receives a predetermined first operation with respect to the icon displayed in the explanatory image in a state in which the explanatory image is displayed on the display screen, the controller executes the function correlated to the icon,
when the operation receiving section receives a predetermined second operation with respect to the icon displayed in the explanatory image, the display control section changes the display of the display screen to the operation image in which the icon is disposed and, simultaneously, displays a process of the change through an animation, and
the controller executes the function correlated to the icon after the display control section completes the change.

9. A computer-readable non-transitory recording medium with a display control program stored thereon, the display control program causing a computer including a processor to act, when the processor executes the display control program, as:
a display control section that causes a display screen of a display section having a touch panel function of sensing proximity and contact of an object to individually display a plurality of operation images in which a plurality of icons are arranged;
an operation receiving section that receives an operation from a user through the touch panel function; and
a controller that, when the operation receiving section receives a user operation of instructing execution of a function correlated to one icon of the plurality of icons, executes the function,
wherein the display control program further causes the computer to act so that,
after the operation receiving section receives a user operation of putting an object close to one icon of one operation image being displayed on the display screen, the one operation image being one of the plurality of operation images, when a state in which the object is being close to the one icon continues for a predetermined time, the display control section causes the display screen to display, in a whole area thereof, an explanatory image including the one icon and a description of the function correlated to the one icon,
when the display screen displaying the explanatory image is displayed, the operation receiving section receives a user operation of instructing a display change to an explanatory image including a different icon different from the icon corresponding to the explanatory image displayed on the display screen and a description of a function correlated to the different icon,
an order different from an arrangement order of each of the icons of the plurality of operation images is assigned to all the icons of the plurality of operation images in advance, the order being a cyclical manner,
when the operation receiving section receives, as the user operation of instructing the display change to the explanatory image including the different icon and the description of the function correlated to the different icon, an operation of a sliding movement in a forward direction or in a reverse direction,
(i) the display control section changes, if the sliding movement is in the reverse direction, the display to an explanatory image including: an icon whose order of the order is one preceding the icon included in the explanatory image displayed on the display screen at this time; and a description of a function correlated to the icon, and
(ii) the display control section changes, if the sliding movement is in the forward direction, the display to an explanatory image including: an icon whose order of the order is one following the icon included in the explanatory image displayed on the display screen at this time; and a description of a function correlated to the icon, and
in accordance with the order, the display control section sequentially changes and causes the display screen to display each of the explanatory images for all the icons of the plurality of operation images in the cyclical manner.

* * * * *